(12) United States Patent
Wilkie et al.

(10) Patent No.: US 7,515,095 B2
(45) Date of Patent: Apr. 7, 2009

(54) SILO CONTENTS MEASUREMENT SYSTEM

(75) Inventors: Neil T. Wilkie, Fairfield, OH (US);
Douglas A. Groh, Cincinnati, OH (US);
Christopher P. Lewis, Liberty
Township, OH (US); William C. Gable,
Amelia, OH (US)

(73) Assignee: Ohmart/VEGA Corporation,
Cincinnati, OH (US)

( * ) Notice: Subject to any disclaimer, the term of this patent is extended or adjusted under 35 U.S.C. 154(b) by 0 days.

(21) Appl. No.: 11/537,253

(22) Filed: Sep. 29, 2006

(65) Prior Publication Data

US 2008/0079628 A1 Apr. 3, 2008

(51) Int. Cl.
*G01F 23/284* (2006.01)
*G01S 13/08* (2006.01)
*G01S 7/02* (2006.01)
*G01S 13/00* (2006.01)

(52) U.S. Cl. ............... 342/124; 342/118; 342/175;
73/290 R; 324/600; 324/629; 324/637; 324/642;
324/644

(58) Field of Classification Search .............. 342/118,
342/124, 175, 190–197; 73/290 R, 304 R,
73/304 C, 290 B, 290 V; 324/629, 637–646,
324/600; 343/872, 873
See application file for complete search history.

(56) References Cited

U.S. PATENT DOCUMENTS

| 4,234,882 | A | * | 11/1980 | Thompson ............... 342/124 |
| 4,290,067 | A | * | 9/1981 | Legille et al. ............ 342/124 |
| 4,566,321 | A | * | 1/1986 | Zacchio .................. 73/290 R |
| 5,305,237 | A | * | 4/1994 | Dalrymple et al. ......... 342/124 |
| 5,507,181 | A | * | 4/1996 | Fox et al. ................. 342/124 |
| 5,872,494 | A | * | 2/1999 | Palan et al. .............. 342/124 |
| 7,075,480 | B2 | * | 7/2006 | Fehrenbach et al. ....... 342/124 |
| 7,134,315 | B1 | | 11/2006 | Stigler et al. |

OTHER PUBLICATIONS

"Nylon: 1935"; no author listed; no date listed; posted on the Internet at dupont.com; copyright years are 1995, 1996, 1997, 1998, 1999, 2000, 2001, 2002, and 2003.*

* cited by examiner

*Primary Examiner*—Bernarr E Gregory
(74) *Attorney, Agent, or Firm*—Wood, Herron & Evans, LLP

(57) ABSTRACT

An antenna for a level sensing gauge comprises an environmentally sealed chamber extending from the level sensing gauge and mounting and positionable within the interior of a storage compartment, including a breathable aperture for permitting pressure and humidity equalization between the interior of said chamber and an exterior environment.

11 Claims, 3 Drawing Sheets

SILO CONTENTS MEASUREMENT SYSTEM

FIELD OF THE INVENTION

The present invention relates to measurements of levels of materials in grain silos and other tanks for storage of dusty products.

BACKGROUND OF THE INVENTION

In many industrial environments, products are processed and/or stored in tanks or bins. Examples include grain silos, tanks used in the batch processing of foods, beverages, or pharmaceuticals. In these industries, one must be able to reliably determine the amount of contents stored within a tank at any given time. This determination may be made visually or through the use of a level sensing gauge. In many instances, the tank prevents any sort of visual determination of the present level of the contents. For example, many silos are composed of steel and/or concrete or other nontransparent materials and, therefore, any visual inspection of the content level of such tanks would involve manually opening an aperture, which may pose hazards to personnel, and raise the potential of contamination of the contents. Furthermore, visual inspection of content levels lacks accuracy and is time consuming. In order to avoid these problems, level sensing gauges are used to measure content levels.

There are several types of level sensing gauges. Examples include those that use mechanical systems and electrical systems, with the electrical versions including radar transmitters or ultrasonic systems, and others. Radar gauges in particular monitor content levels by transmitting microwave pulses from an antenna toward the surface of the tank contents. These pulses are reflected from the contents and back to the antenna. The antenna cone or rod-shaped. Other radar gauges use a continuous wave rather than pulses with a similar antenna.

Radar sensors are suitable for measuring levels of liquids, solids, powders, granules, dust, corrosive steam and vapors, regardless of the media characteristics, environment, low and high pressures or temperatures. Radar signals are unaffected by noise, by extreme air turbulence (such as during pneumatic filling), by fluctuations in dielectric constant, density, or conductivity. Even liquids having highly agitated surfaces or gas bubbles are usually reliably measured. Gas layering such as that produced by solvents or gases has virtually no adverse effect.

Although radar signals are generally useful for measurement of multiple materials, radar measurement gauges are sensitive devices and prone to malfunction when exposed to dust or condensation, particularly in the transmitting and receiving antenna. Particles of dust within the antenna may create false echoes preventing reliable measurement of level, and drops of fluid in the radar transmission path may have a similar effect.

U.S. patent application Ser. No. 09/178,836, filed Oct. 6, 1998, now U.S. Pat. No. 7,134,315 issued Nov. 14, 2006, assigned to the same assignee as this application and incorporated herein in its entirety, describes a mounting for a radar level sensing gauge sold by the assignee, that is particularly intended for sanitary environments such as food processing. For this application, a hole is first cut into the body of a storage tank, generally the roof. Next, the level sensing gauge is then inserted through the hole into the tank with its probe antenna extending into the tank inside of a probe cover. The probe cover includes a sealing flange that seals to the housing of the tank to prevent contamination of the contents of the tank through the hole. The probe is positioned beneath the surface of the tank when the level sensing gauge is attached to the tank, thereby reducing the disruption of radar emissions by the tank itself.

While the above-referenced patent application provides an effective solution to prevent contamination of the contents of a tank, it does not provide a solution for level sensing gauges that utilize a cone-shaped antenna, nor does it provide a seal usable on such a gauge to prevent entrapment of dust or moisture from outside of the tank which could cause false echoes and malfunction of the level sensing gauge. Dust and moisture from such sources is particularly problematic on grain silos which operate in dusty, outdoor environments that are subject to extreme temperature and humidity variations.

In view of the above background, there is need for a level sensing gauge which is usable with a storage tank in a dusty, temperate and moist environment, to prevent the ingress of dust or moisture into the antenna structure and malfunctions resulting therefrom. Further, it is desirable that as the level sensing gauge is mounted to a storage tank the antenna is positioned within the tank to reduce interference between the radar signal and the body of the tank.

SUMMARY OF THE INVENTION

This invention solves the problems associated with known apparatus for measuring levels of the contents of a storage compartment, by providing an antenna and mounting system for a level sensing gauge, the antenna comprising an environmentally sealed chamber extending from the level sensing gauge and mounting and positionable within the interior of a storage compartment, the chamber conveying electromagnetic waves from the level sensing gauge into the compartment, and the environmentally sealed chamber further including a breathable aperture for permitting pressure and humidity equalization between the interior of said chamber and an exterior environment.

In particular embodiments, the chamber forms an antenna horn extending from the mount, the mount positioned adjacent to the level sensing gauge generally between the gauge and antenna horn. The chamber may be sealed on an end distal to the gauge by a sealing cap which may be held in place by a clamp. Furthermore, the breathable aperture may comprise a passageway extending from an exterior of the chamber to an interior thereof, the passageway being closed by a thin, membrane including pores smaller in size than a water droplet but of sufficient size to permit passage of water vapor and air. The membrane may be, for example, a porous fluoropolymer membrane with a urethane coating bonded to fabric, such as nylon or polyester.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE DRAWING

Figures 1, 2:
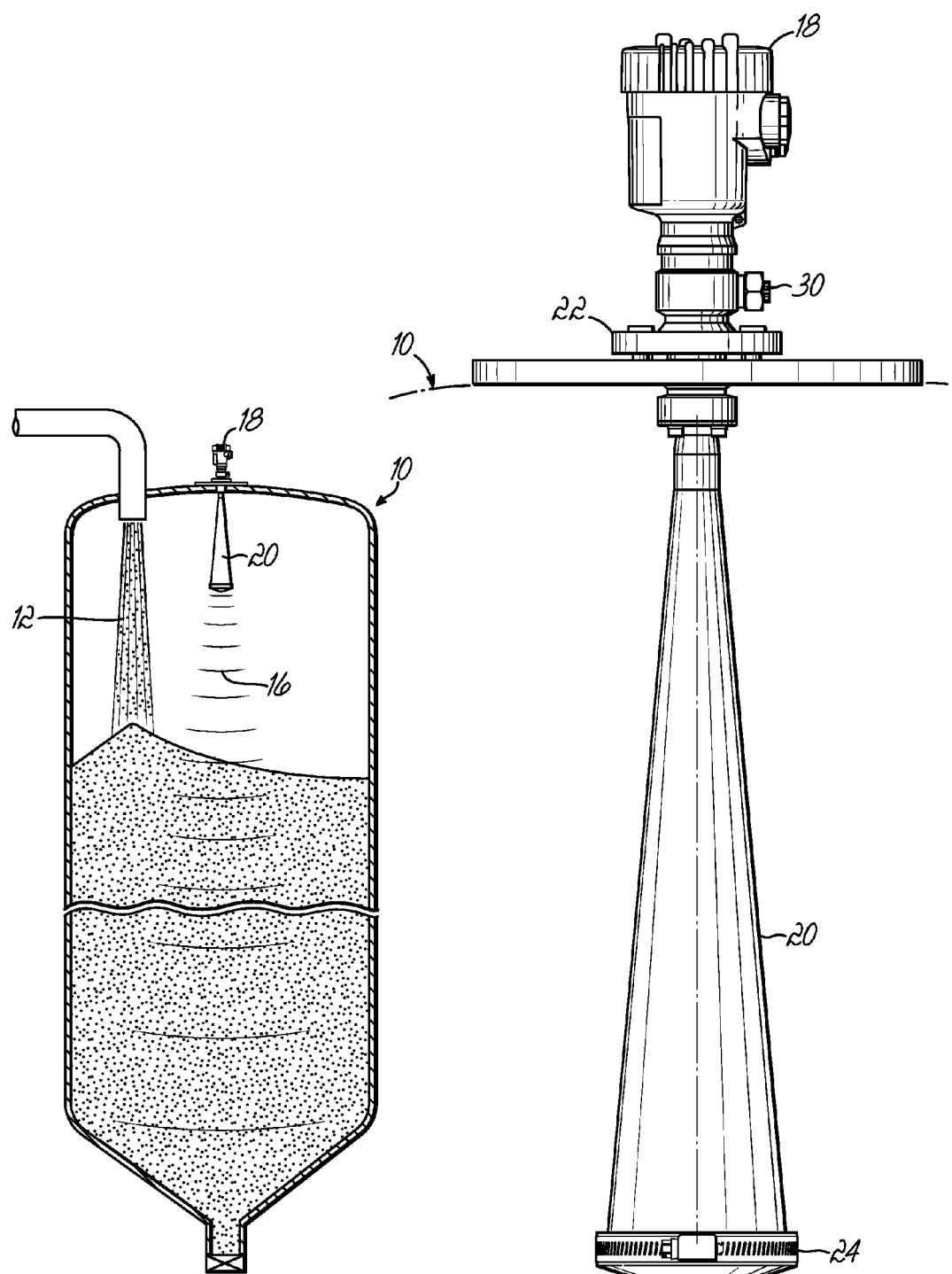
FIG. 1 partial cutaway view of a gauge, antenna, and mounting positioned on a grain silo in accordance with principles of the present invention.
FIG. 2 is a elevational view of the gauge, antenna and mounting of FIG. 1.

The above-noted difficulties arising from dust and moisture are particularly acute in the measurement of level on grain silos or other outdoor, dusty applications. FIG. 1 illustrates a typical grain silo application of radar-based level sensing, using an inventive antenna and mounting according to principles of the present invention. Referring to FIG. 1, a silo 10 is filled with grain 12 from an inlet 14, and the level of grain is measured by radar waves 16 (pulsed or continuous) emitted by a level sensing guage 18. The gauge 18 may be any of several commercially available radar sensing gauges, such as a member of the VEGAPULS® 60 family of gauges sold by the assignee of the present application.

Gauge 18 is mounted to the exterior wall of the silo 10 by a mounting and antenna system made in accordance with principles of the present invention. This system includes an antenna 20 which in the illustrated example takes the form of a microwave horn, coupled to a mounting 22 attached to the gauge 18.

As illustrated in FIG. 2, horn antenna 20 is mounted to the outer wall of silo 10 through a hole therein, and bolted or otherwise affixed to the wall of the silo 10 by mounting 22. Horn antenna 20 is of a size and configuration to guide microwave pulses or waves from gauge 18 into the interior of silo 10 and receive reflected pulses or waves for measurement, as is known in the art.

The interior of horn antenna 20 must be kept clear of dust and moisture to ensure continued accurate operation of gauge 18. In many applications where dust and humidity and temperature variation are not important difficulties, a horn antenna having dimensions similar to horn 20 shown in FIG. 2 is coupled to a storage tank or vat and left otherwise unprotected from contamination and the elements. However, such an application would likely incur problems in a grain silo due to accumulation of dust from the grain in the silo.

To reduce accumulation of dust, a sealing cap 22 is positioned on the distal end of horn 20, and secured in position, such as by a hose clamp 24 as shown in FIG. 2. Sealing cap 22 is made of a material penetrable by microwave such as PTFE, a.k.a. TEFLON® material. As seen in the detail view of FIG. 4, sealing cap 22 forms an air- and water-tight seal with the distal end of horn antenna 18. Sealing material such as silicon caulk 26 is introduced between cap 22 and horn antenna to seal against ingress of water and dust. A conventional hose clamp 24 is tightened about cap 22 to hold cap 22 tightly in place.

The positioning of cap 22 over the distal end of horn antenna 20 is effective for preventing the ingress of dust and moisture into the sealed cavity inside the horn antenna 20, however, the sealed cap does not prevent the accumulation of condensed moisture within this sealed cavity under extremes of temperature variation. For example, in extreme cold conditions, a sealed chamber will accumulate condensed moisture on the walls thereof, which moisture will tend to pool on the interior surface of cap 22 and potentially cause measurement errors.

To alleviate such measurement errors, the antenna and mounting system of the present invention further includes a breathing passageway 30 at a location generally adjacent the mounting 22. Passageway 30 permits the equalization of pressure, temperature and humidity between the interior and exterior of the sealed chamber formed by antenna horn 20, and thus reduces the likelihood of condensation of moisture on the interior of antenna horn 20 and resulting measurement error.

Figure 3:
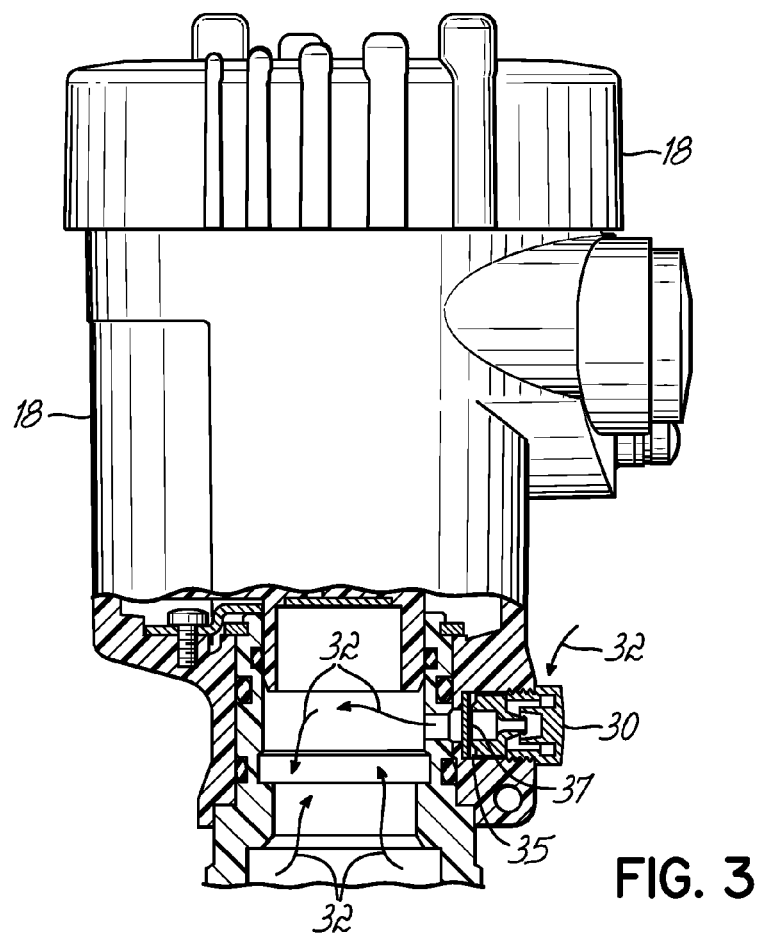
FIG. 3 is a partial cross-sectional view of the mounting and gauge of FIGS. 1 and 2 illustrating the passageway extending from the sealed interior chamber of the antenna to the exterior environment.

Referring now to FIG. 3, it can be seen that passageway 30 permits the flow of air and water vapor between an exterior of the sealed antenna horn 20 and interior thereof, and permits equalization of humidity and pressure due to convection and diffusion as generally represented by arrows 32.

Figure 4:
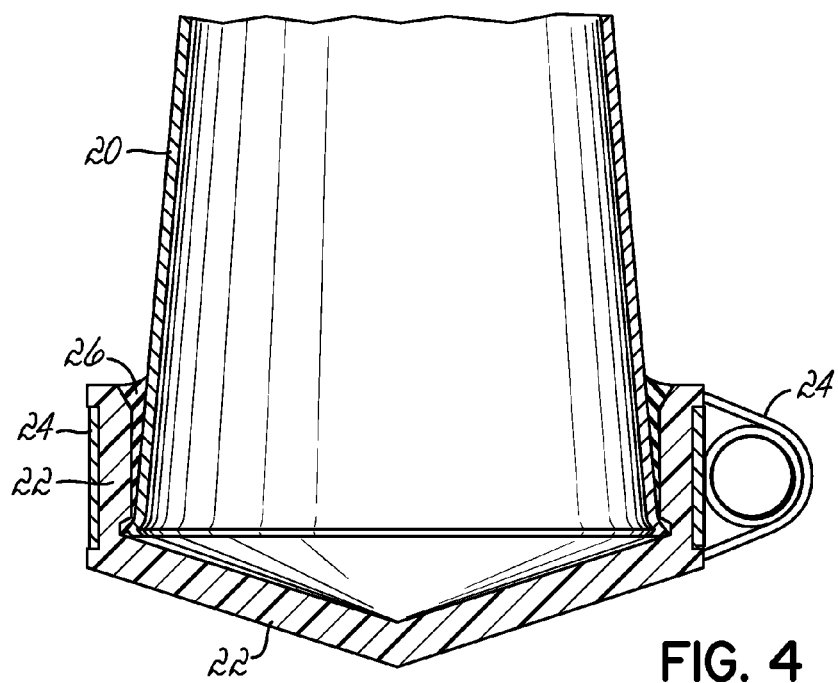
FIG. 4 is cross-sectional view of the distal end of the antenna of FIGS. 1 and 2 illustrating the sealing cap and clamp thereon.
Figure 5:
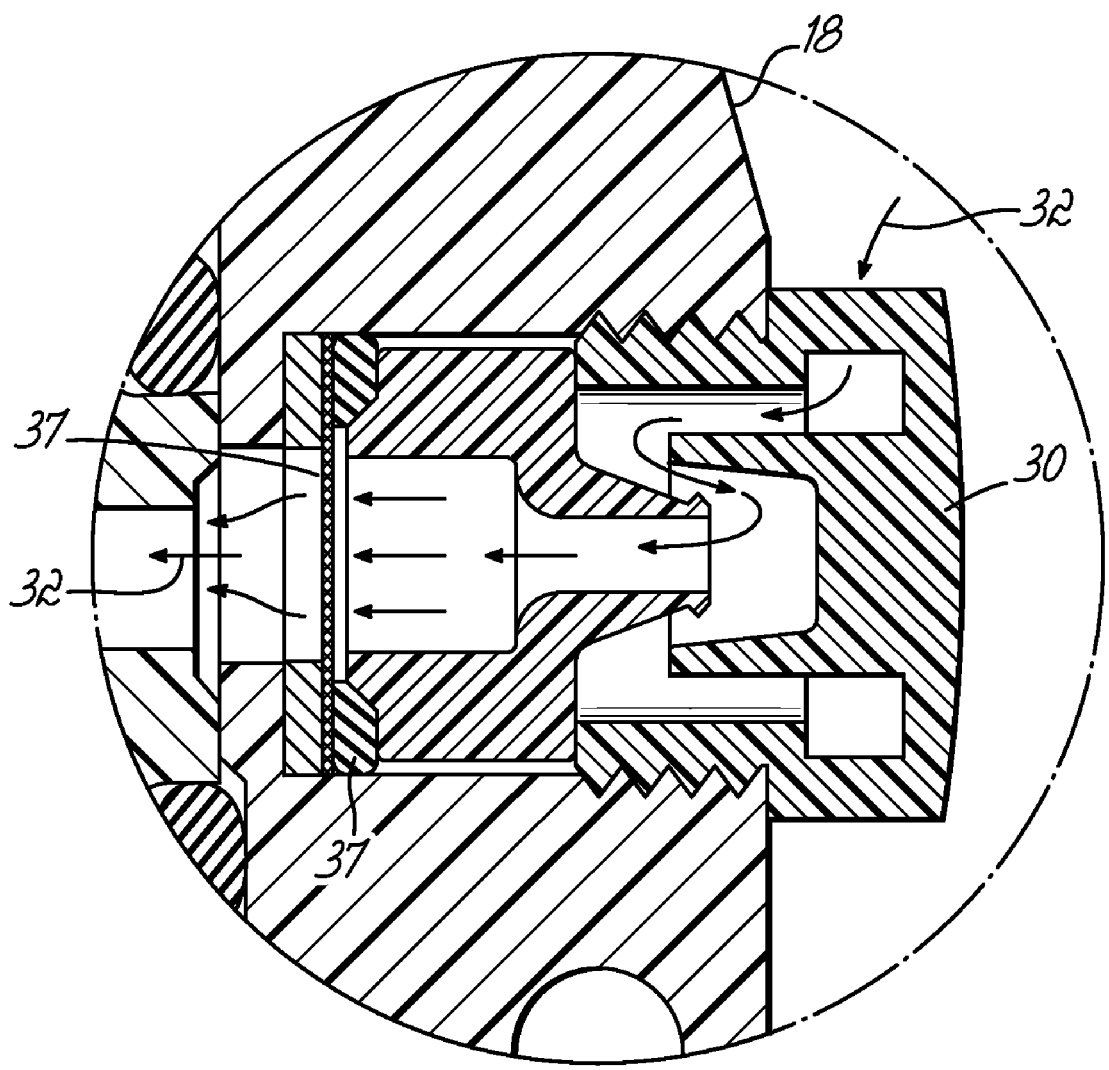
FIG. 5 is a cross-sectional view of the membrane positioned within the passageway shown in FIG. 3.

Referring to FIG. 4, it can be seen that passageway 30 includes therein, a breathable membrane 37 closing the passageway 30. Membrane 37 is surrounded by a silicon o-ring 35 and effectively seals the passageway 30 against the flow of water droplets. Membrane 37, however, is porous and may be, for example, a porous fluoropolymer membrane with a urethane coating bonded to fabric, such as nylon or polyester, such as is sold under the trademark "Gore-Tex". A suitable fabric includes micropores of sufficient size to permit passage of water vapor and air but prevent the passage of water droplets.

The membrane 37 permits equalization of pressure and humidity between an interior and exterior of the sealed chamber formed by antenna 20, thus reducing the likelihood of condensation therein and measurement error.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An antenna and mounting system for a level sensing gauge, comprising:

a mounting for positioning the antenna and mounting upon a storage compartment with the antenna extended into an interior of said compartment, an antenna comprising an environmentally protected chamber extending from the mounting and positioned within the interior of said storage compartment, the chamber conveying electromagnetic waves from the level sensing gauge into the compartment, wherein the environmentally sealed chamber further includes an aperture having a membrane that permits passage of water vapor and air from and to an interior of said compartment, but limits passage of water droplets from and to an interior of said compartment, for permitting pressure and humidity equalization between the interior of said chamber and an environment exterior to said chamber.

2. The antenna and mount of claim 1 wherein said antenna is a horn antenna extending from the gauge.

3. The antenna and mount of claim 1 wherein the mount is positioned proximate the gauge and the antenna extends from the mount and gauge.

4. The antenna and mount of claim 1 wherein the chamber is sealed on an end distal to the gauge.

5. The antenna and mount of claim 4 wherein the chamber is sealed by a sealing cap held in place by a clamp.

6. The antenna and mount of claim 1 wherein the aperture comprises a passageway extending from an exterior of the chamber to an interior thereof and said membrane closes the passageway.

7. The antenna and mount of claim 6 wherein the membrane includes pores of sufficient size to permit passage of water vapor and air.

8. The antenna and mount of claim 7 wherein the membrane is a porous fluoropolymer membrane.

9. The antenna and mount of claim 8 wherein the membrane has a urethane coating.

10. The antenna and mount of claim 7 wherein the membrane is bonded to a fabric.

11. The antenna and mount of claim 10 wherein the fabric is nylon or polyester.

\* \* \* \* \*